(12) United States Patent
Talanjeri Krishna et al.

(10) Patent No.: US 10,181,261 B2
(45) Date of Patent: Jan. 15, 2019

(54) MOBILE USER INTERFACE FOR SECURITY PANEL

(71) Applicant: UTC Fire & Security Americas Corporation, Inc., Bradenton, FL (US)

(72) Inventors: Prashantha Talanjeri Krishna, Hyderabad (IN); Michael Ramoutar, Westford, MA (US); Darin Eames, Portland, OR (US); Sunil Kumar Neckaraje, Hyderabad (IN); Phani Pavan Kumar Mangaiahgari, Hyderabad (IN); Anantha Krishnan N, Hyderabad (IN)

(73) Assignee: UTC FIRE & SECURITY AMERICAS CORPORATION, INC., Bradenton, FL (US)

( * ) Notice: Subject to any disclaimer, the term of this patent is extended or adjusted under 35 U.S.C. 154(b) by 0 days.

(21) Appl. No.: 15/035,960

(22) PCT Filed: Sep. 10, 2014

(86) PCT No.: PCT/US2014/054896
§ 371 (c)(1),
(2) Date: May 11, 2016

(87) PCT Pub. No.: WO2015/073107
PCT Pub. Date: May 21, 2015

(65) Prior Publication Data
US 2016/0267780 A1    Sep. 15, 2016

Related U.S. Application Data

(60) Provisional application No. 61/902,920, filed on Nov. 12, 2013.

(51) Int. Cl.
*G05B 11/01* (2006.01)
*G08C 17/02* (2006.01)
(Continued)

(52) U.S. Cl.
CPC .............. *G08C 17/02* (2013.01); *H04W 4/14* (2013.01); *H04W 76/10* (2018.02); *G08C 2201/63* (2013.01); *G08C 2201/93* (2013.01)

(58) Field of Classification Search
None
See application file for complete search history.

(56) References Cited

U.S. PATENT DOCUMENTS 7,030,752 B2   4/2006  Tyroler
7,123,933 B2  10/2006  Poor et al.
(Continued)

FOREIGN PATENT DOCUMENTS

EP    0721282 A2   7/1996
WO    9401963 A1   1/1994
(Continued)

OTHER PUBLICATIONS

Atlas Security, "iOS Android App", www.atlassecurity.com/apps, accessed May 11, 2016, 4 pages.
(Continued)

*Primary Examiner* — Adolf Dsouza
(74) *Attorney, Agent, or Firm* — Cantor Colburn LLP

(57) ABSTRACT

A remote control for a monitoring system of a building is provided including a mobile device having a plurality of communication channels and a media storage area. An application is stored in the media storage area of the mobile device. The application is configured to communicate with a control panel of the monitoring system. The application dynamically selects a communication channel to establish a communication link with the control panel based on a predetermined hierarchy. The application operates in one of a plurality of modes based on the communication channel selected.

20 Claims, 4 Drawing Sheets

(51) Int. Cl.
*H04W 76/10* (2018.01)
*H04W 4/14* (2009.01)

(56) References Cited

U.S. PATENT DOCUMENTS

| | | | |
|---|---|---|---|
| 7,340,438 B2 * | 3/2008 | Nordman | G06Q 20/382 |
| | | | 705/51 |
| 7,394,359 B2 | 7/2008 | Eskildsen | |
| 7,639,182 B2 | 12/2009 | Schmidt et al. | |
| 7,679,503 B2 | 3/2010 | Mason | |
| 7,773,612 B2 | 8/2010 | Ke et al. | |
| 7,774,495 B2 | 8/2010 | Pabla et al. | |
| 7,844,353 B2 | 11/2010 | Bejean et al. | |
| 7,852,200 B2 | 12/2010 | Romanczyk et al. | |
| 8,060,017 B2 | 11/2011 | Schlicht et al. | |
| 8,086,703 B2 | 12/2011 | Baum et al. | |
| 8,175,528 B2 | 5/2012 | He et al. | |
| 8,189,474 B2 | 5/2012 | Venkataraman et al. | |
| 8,190,275 B2 | 5/2012 | Chang | |
| 8,242,900 B2 | 8/2012 | Bennett, III et al. | |
| 8,294,574 B2 | 10/2012 | Haywood | |
| 8,320,901 B2 | 11/2012 | Klein et al. | |
| 8,375,140 B2 | 2/2013 | Tippin et al. | |
| 8,458,800 B1 | 6/2013 | Van Voorhees et al. | |
| 8,495,244 B2 | 7/2013 | Bonar et al. | |
| 8,552,843 B2 * | 10/2013 | Dizechi | G08C 17/02 |
| | | | 340/12.22 |
| 2002/0070873 A1 * | 6/2002 | Davies | G05B 19/042 |
| | | | 340/12.3 |
| 2004/0266419 A1 * | 12/2004 | Arling | G08C 17/00 |
| | | | 455/420 |
| 2007/0052549 A1 * | 3/2007 | Le | G08C 17/00 |
| | | | 340/13.24 |
| 2008/0183307 A1 | 7/2008 | Clayton et al. | |
| 2009/0070681 A1 | 3/2009 | Dawes et al. | |
| 2009/0232307 A1 | 9/2009 | Romanczyk et al. | |
| 2009/0239468 A1 | 9/2009 | He et al. | |
| 2010/0008673 A1 * | 1/2010 | Nakamura | G08C 23/04 |
| | | | 398/106 |
| 2010/0121968 A1 | 5/2010 | Clark | |
| 2010/0165947 A1 | 7/2010 | Taniuchi et al. | |
| 2010/0277302 A1 | 11/2010 | Cohn et al. | |
| 2011/0309929 A1 | 12/2011 | Myers | |
| 2012/0113809 A1 | 5/2012 | Cortes Gomez et al. | |
| 2012/0158161 A1 | 6/2012 | Cohn et al. | |
| 2012/0286951 A1 | 11/2012 | Hess et al. | |

FOREIGN PATENT DOCUMENTS

| | | |
|---|---|---|
| WO | 2006071123 A1 | 7/2006 |
| WO | 2007066154 A1 | 6/2007 |
| WO | 2007082035 A2 | 7/2007 |
| WO | 2011069092 A1 | 6/2011 |

OTHER PUBLICATIONS

Digital Monitoring Products, "DMP Virtual Keypad App", www.dmp.com/apps, accessed May 11, 2016, 6 pages.
Home Controls, "ipFob for iPhone, iPad and Android", www.homecontrols.com/ipFob-iPhone-Android-App, accessed May 11, 2016, 7 pages.
International Search Report and Written Opinion for application PCT/US2014/054896, dated Dec. 3, 2014, 8 pages.
PCT International Preliminary Report on Patentability; International Application No. PCT/US2014/054896; International Filing Date: Sep. 10, 2014; dated May 17, 2016, pp. 1-5.

* cited by examiner

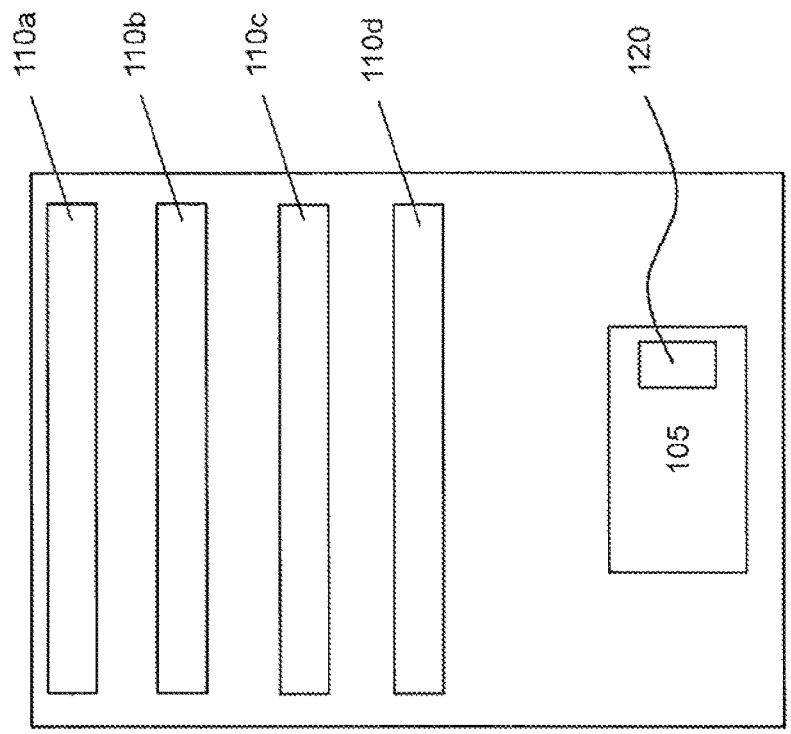
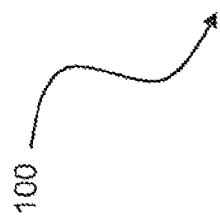

MOBILE USER INTERFACE FOR SECURITY PANEL

CROSS-REFERENCE TO RELATED APPLICATION

This application claims the benefit of U.S. provisional patent application Ser. No. 61/902,920 filed Nov. 11, 2013, the entire contents of which are incorporated herein by reference.

BACKGROUND OF THE INVENTION

Embodiments of the invention relate to an automation system and, more particularly, to a method for using a mobile device as a means of remotely controlling such an automation system.

Building automation systems (BAS), such as those used to provide security and monitoring to residential properties for example, have become increasingly popular. Building automation systems are systems in which a computerized (intelligent) network of electronic devices monitor and control a multitude of individual systems or devices in a building, such as a home for example. By using intelligent automated systems in a building, energy and maintenance costs of the building may be reduced and the building can be made more secure.

Multiple individual systems are controlled in a BAS. Exemplary systems include, for example: a heating, ventilation, and air conditioning (HVAC) system, an energy management system (EMS) such as a lighting control system a security and access control system (SAC), and a fire, life, safety system (FLS). In a conventional BAS, each system is controlled commonly, such as through a control panel configured to communicate with each system via one or more wireless networks.

Remote control devices configured to communicate with a control panel of a BAS may be expensive and generally only work within a certain distance of the control panel. Mobile devices having a specific application downloaded thereon, such as a smartphone or personal digital assistant (PDA) for example, may be used to communicate with a third party server in communication with the RAS to monitor at least one of the systems of the BAS, such as a security system for example. Because the mobile device is only able to communicate with the third party server and not the control panel of the BAS directly, the functionality of the mobile device with respect to management of the BAS is limited.

BRIEF DESCRIPTION OF THE INVENTION

According to one embodiment of the invention, a remote control for a monitoring system of a building is provided including a mobile device having a plurality of communication channels and a media storage area. An application is stored in the media storage area of the mobile device. The application is configured to communicate directly with a control panel of the monitoring system. The application dynamically selects a communication channel to establish a communication link with the control panel based on a predetermined hierarchy. The application operates in one of a plurality of modes based on the communication channel selected.

According to another embodiment of the invention, a monitoring system configured to integrate control of a plurality of systems is provided including a control panel operably coupled to a plurality of input devices. The control panel includes a plurality of communication modules. Each of the communication modules is configured to communicate with at least one of the plurality of communication channels of a mobile device. The control panel includes a controller configured to control operation of the plurality of communication: modules and communicate with the plurality of input devices.

According to another embodiment of the invention, a method of establishing a communication link between a control panel of a monitoring system and a mobile device including an application configured to remotely control the monitoring system is provided. The application detects one or more communication channels of the mobile devices and prioritizes the communication channels based on a predefined hierarchy stored within the application. The application evaluates whether a first communication link can be established using a first priority communication channel. If the first communication link cannot be established, the application evaluates whether a second communication link can be established using a second priority communication channel. If the second communication link cannot be established, the application evaluates whether a third communication link can be established using a third priority communication channel. If the third communication link cannot be established, the application evaluates whether a fourth communication link can be established using a fourth priority communication channel.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 2 is a schematic diagram of as mobile device according to an embodiment of the invention;

The detailed description explains embodiments of the invention, together with advantages and features, by way of example with reference to the drawings.

DETAILED DESCRIPTION OF THE INVENTION

Figure 1:
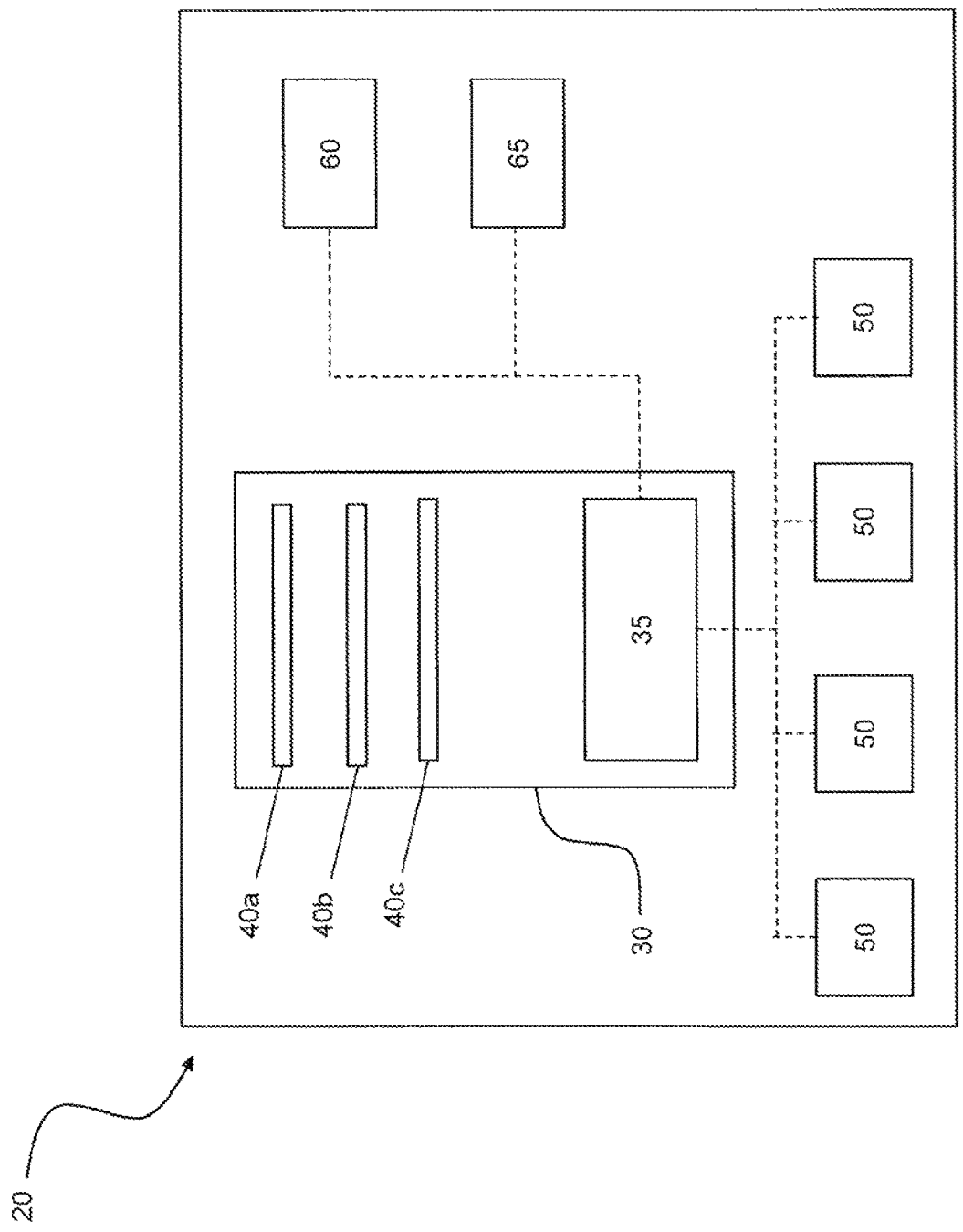
FIG. 1 is a schematic diagram of a monitoring system according to an embodiment of the invention.

FIG. 1 illustrates an example of a monitoring system 20 including as monitoring system control panel 30 configured to provide management of one or more electronic, devices or systems.

The monitoring system control panel 30 includes a controller 35 and a plurality of communication modules 40. The controller 35 is configured to control a monitoring system, such as a security system or an automation system integrating control of a plurality of devices or systems for example, that includes the monitoring system control panel 30. In one embodiment, the controller 35 includes a processor or other control circuitry (not shown) configured to execute instructions of a program that controls the operation of a monitoring system 20. The controller 35 may be configured to communicate with and control operation of one or more input/output devices 50 included in the monitoring system 20. In addition, the controller 35 may also be configured to control operation of the plurality of communication modules 40 included in the monitoring system control panel 30.

The communication modules 40 are configured to enable an exchange of electronic information between the control panel 30 and other devices, such as a remote control or a mobile device for example. Exemplary methods of communication for the plurality of communication modules 40 include, but are not limited to, Bluetooth, radio frequency, near field communication, wireless local area network, global system for mobile communication, or a cellular network for example. In one embodiment, a first communication module 40a is a Bluetooth communication device and a second communication module 40b is a wireless communication device configured to exchange communication over a wireless data channel. A third communication module 40c may be a wireless communication device configured to exchange communications via the global system for mobile communications (GSM) or via a cellular network.

Any of the plurality of communication modules 40 may alternatively be a wired communication module configured to exchange communications using a wired connection. For instance, the communication module 40 may be a modem, a network interface card, or another type of network interface device. The communication module 40 may be an Ethernet network card configured to enable the monitoring system control panel to communicate over a local area network and/or the Internet.

The monitoring system 20 includes one or more input devices 50 such as sensors or detectors or other devices (e.g. as thermostat, an appliance, lights, sprinklers etc . . . ). Exemplary sensors of an alarm system include, but are not limited to, a contact sensor, a motion sensor, and a glass break sensor for example. In embodiments where the monitoring system 20 san automation system, the input devices 50 may also include environmental sensors, such as a light detector, temperature sensor, or smoke detector for example, or may include video or photographic sensors configured to capture images. In one embodiment, the input devices 50 to the monitoring system 20 include a controller of at least one of the systems integrated therein, such as a controller of a temperature, sprinkler or entertainment system for example.

The input devices 50 are operably coupled to the controller 35 of the monitoring system control panel 30 via either a wired or wireless interface. The input devices 50 may be configured to continuously transmit signals to the controller 35, periodically transmit signals to the controller 35, or transmit signals to the controller 35 in response to a measured change. The controller 35 may store data received from the plurality of input devices 50 in a memory thereof and perform analysis of said data. In response to the analysis performed, the controller 35 may detect an alarm or other event. The controller 35 receives data from an input device 50 and determines what event has occurred based on the signal. The controller 35 controls operation of the monitoring system 20 and each of the systems integrated into the monitoring system 20 based on the determination that a predefined event has occurred.

In one embodiment, the monitoring system 20 also includes a display device 60. The display 60 may be any type of electronic display configured to render a visually perceivable display of information (e.g., an LCD display, a plasma display, a television, a computer monitor, a digital picture frame a display integrated into an appliance, a display included in a portable device of a user, a mirror, a projection display device, etc.). The display 60 may be integrated into the monitoring system control panel 30 or may be separate from the monitoring system control panel 30. The display 60 may he used to depict the current state of the monitoring system 20. For example, an LCD display may display electronic content, such as a current setting or status of any of the input devices 50 of the monitoring system 20. In one embodiment, the display 60 includes a graphical user interface (GUI), thereby allowing an operator to control the settings or operation of the monitoring system 20. The display 60 may include a touch screen and/or one or more tactile buttons (not shown) configured to provide feedback to the controller 35 when a force is applied thereto.

The monitoring system 20 may also include a speaker 65. The speaker 65 may include an electromechanical transducer that converts an electrical signal into sound. The speaker 65 may receive an electrical signal from the controller 35 and produce an audible output based on the electrical signal. For example, the controller 35, in response to detecting an alarm event, may generate to signal causing the speaker 65 to produce an audible alarm sound. In another example, the controller 35 may send a signal representative of a voice communication to the speaker 65 to cause the speaker 65 to produce an audible output of the voice communication.

Referring now to FIG. 2 a mobile device 100 that may be utilized to remotely control the monitoring system 20 is illustrated. Exemplary mobile devices 100 include, but are not limited to, a computer, a tablet, a personal digital assistant (PDA), a smartphone, a cellular device with sms capabilities, or any other device configured to communicate over a network and display information for example. The mobile device 100 may use one or more operating systems (OS), such as MICROSOFT MOBILE®, BLACKBERRY OS®, or iOS for example, and generally includes an application/media storage area 105.

The mobile device 100 is configured to communicate with and receive information using any of a plurality of communication channels 110 integrated therein. Exemplary communication channels 110 are configured to communicate using Bluetooth, a local or public data network, radio frequency, near field communication, to cellular network, or any other wireless or wired network for example. In one embodiment, each communication channel 110 of the mobile device 100 is configured to communicate with a communication module 40 of the control panel 30 using the same or a similar protocol via as communication link 115 (see FIG. 3).

The mobile device 100 includes a software/firmware application 120 which may be downloaded to the mobile device 100 and stared in the application/media storage area 105 thereof. The application 120 provides an interface for remotely or locally accessing the control panel 30 of the monitoring system 20. In one embodiment, the application 120 provides a GUI that may be similar or dissimilar to the GUI of the display device 60, which allows a user to similarly manage and control the settings of the monitoring system 20.

The application 120 is configured to operate in a plurality of modes, such as a first mode, a second mode, and a third mode. Each mode is associated with one or more of the communication channels 110 of the mobile device 100. As a result, the functionality available in each mode is dependent on the type of communication channel 110 being used to communicate with the control panel 30. In one embodiment, the first mode is associated with a Bluetooth connection, a private Wi-Fi connection, or a local radio frequency channel. When the application 120 is in a first or "local" mode, a user will be able to arm and disarm the security input devices 50 of the monitoring system 20, as well as adjust settings related to the other input devices 50 integrated into the monitoring system 20. Emergency operation will also be available to the user in the local mode. In one embodiment, when the application is in a first local mode, the mobile device 100 is configured to function as a key fob.

A second mode of the application 120 is associated with a public Wi-Fi (wireless area network) connection, a data network connection, or a server. When the application 120 is in a second "remote" mode, a user will similarly be able to arm and disarm the security input devices 50 as well as adjust other settings of the monitoring system 20. In addition, the user may access video feeds, such as from the video input devices 50 for example, and perform other data intensive operations. The third mode of the application 120, associated with a cellular network connection including GSM, or SMS (short message service), provides a user with limited access to the monitoring system 20 such that a user will only be able to perform very basic operations, such as arming and disarming the security input devices 50 for example. Though the illustrated non-limiting embodiment discloses a mobile device including four distinct communication channels 110, a device 100 having any number of communication channels 110 is within the scope of the invention.

The application 120 additionally defines a hierarchy of all of the communication channels 110 of the mobile device 100. In one embodiment, the communication channel 110a configured to provide a Bluetooth connection is given the highest priority, the communication channel 110b configured to provide a private Wi-Fi connection is given the second highest priority, a communication channel 110c configured to provide a public data connection is given a third highest priority, and a communication channel 110d configured to provide a GSM connection is given the lowest priority. Though the illustrated non-limiting embodiment discloses a mobile device 100 including four distinct communication channels 110, any device 100 having at least two communication channels 110 is within the scope of the invention.

In instances when multiple communication channels 110 of the mobile device 100 are available for connection with the control panel 30, the application 120 will select a communication channel 110 based on the predefined hierarchy to maximize the benefit to the user. Information may be transmitted between the mobile device 100 and the control panel 30 via only a single communication channel 110 at any given time. If while the application 120 is running a selected communication channel 110 becomes unavailable, the application 120 will automatically reevaluate which communication channels 110 are available and make a selection based on the hierarchy. As a result of this dynamic connectivity, the operational mode of the application 120, and therefore the functionality available to the user will similarly change without the user having to close and restart the application.

Figure 3:
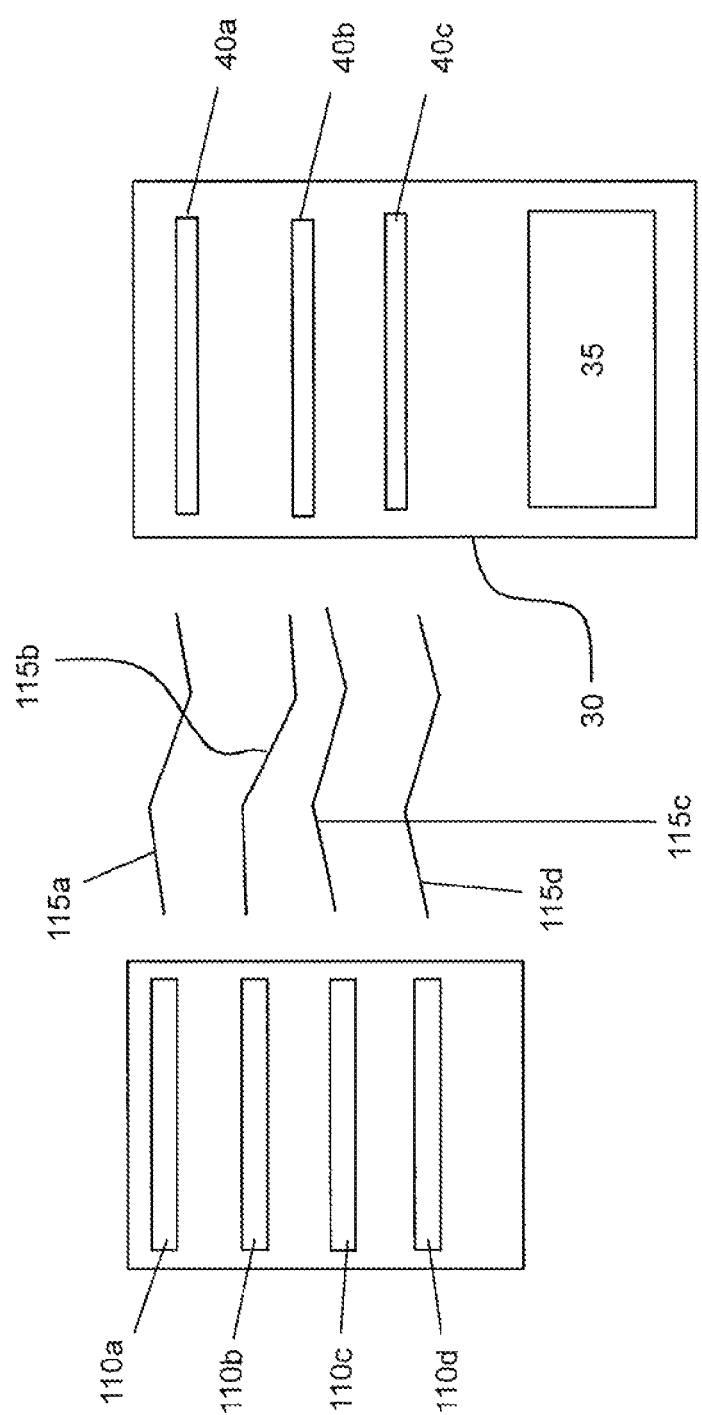
FIG. 3 is a schematic diagram of communication between a mobile device and a monitoring system according to an embodiment of the invention.
Figure 4:
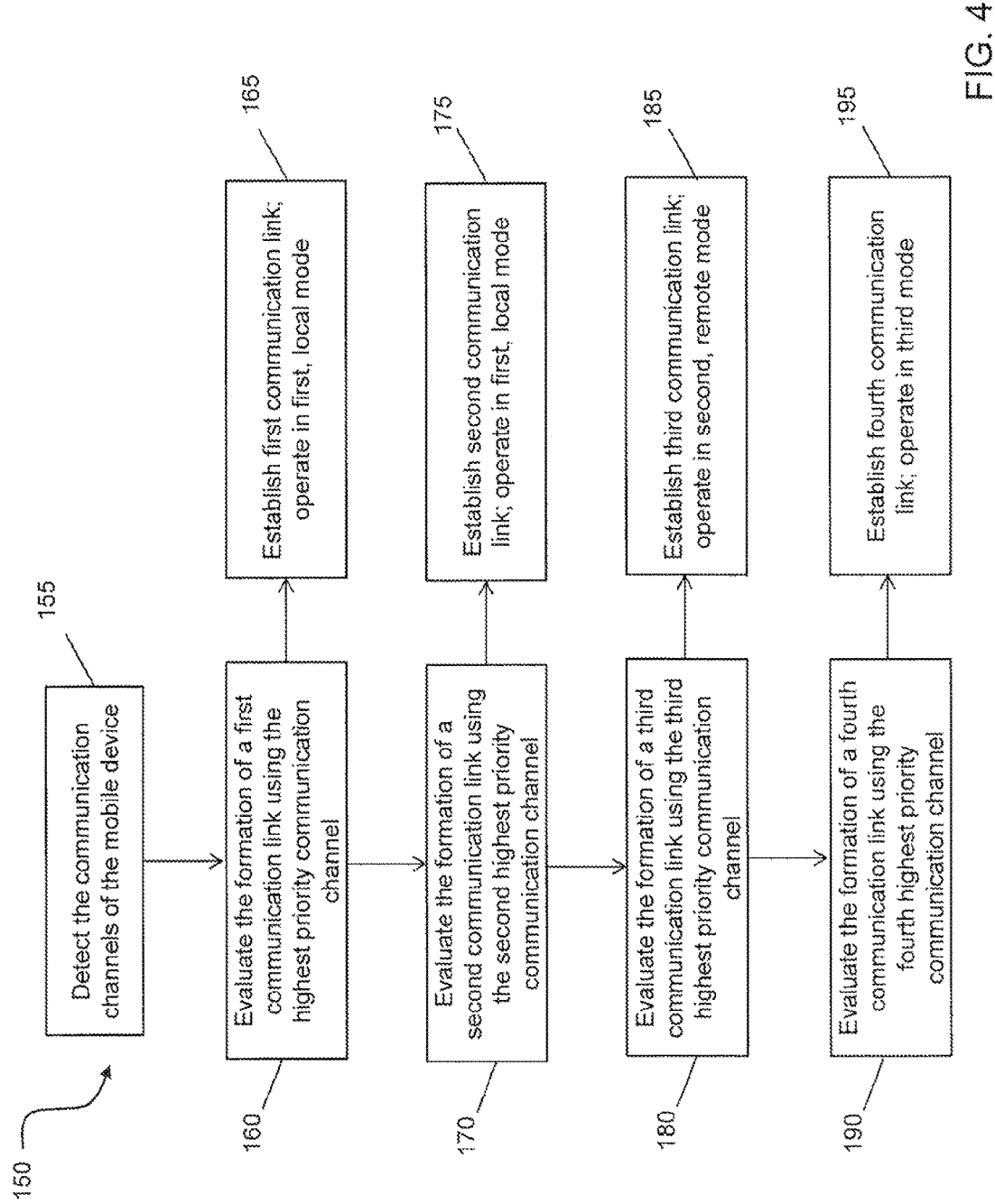
FIG. 4 is a schematic diagram of a method of establishing a communication link between a mobile device and a monitoring system according to an embodiment of the invention.

Referring now to FIGS. 3 and 4, a method 150 for establishing a communication link 115 between the mobile device 100 and the control panel 30 is illustrated. The method 150 assumes that the mobile device 100 has been properly registered with the monitoring system 20 and that a user has entered valid credentials when initiating the application 120. In addition, the application 120 will be configured to store the necessary authentication details to be exchanged with the controller 35 during the initial connection. As shown in block 155, the application 120 will detect the plurality of communication channels 110 of the mobile device 100. Based on the predefined hierarchy, the application 120 will evaluate whether a communication link 115a may be established between the communication channel 110a having the first priority and a corresponding communication module 40a of the control panel 30, see block 160. If the first priority communication channel 110a is active and able to communicate with a first communication module 40a of the control panel 30, a first communication link 115a directly connects the mobile device 100 to the control panel 30 of the monitoring system 20 (block 165). As a result, the application 120 is operated in a first, local mode. Depending on the distance that the mobile device 100 is located from the control panel 30, the communication channel 110a having the first priority may not be able to successfully communicate with the control panel 30. In such instances, the application 120 will evaluate the feasibility of forming a communication link 115b using the second priority communication channel 110b, as shown in block 170.

In block 175, a second communication link 115b is established when the second priority communication channel 110b is active and able to communicate with the second communication module 40b of the control panel 30. In embodiments where the second communication link 115b provides a private Wi-Fi connection, the application 120 similarly operates in the first, local mode. If the second communication link 115b cannot be established, the application 120 attempts to establish a communication link 115c between the third priority communication channel 110c and the second communication module 40b, see block 180. As shown in block 185, once the third communication link 115c is generated, the application 120 operates in a second, remote mode.

If a communication link 115c cannot be established using the third priority communication channel 110c, as shown in block 190, the application 120 will attempt to establish a fourth communication link 115d between the lowest priority communication channel 110d and the third communication module 40c of the control panel 30. In block 195, when the fourth communication link 115d is successfully created, the application 120 operates in a third mode. In one embodiment, the controller 30 includes a non-graphical user interface configured to receive encrypted information sent via either GSM or SMS, such as when the application 120 is in the third mode for example. If no communication link 115 may be established using any of the communication channels 110 of the mobile device 100, the method 150 will start again. Regardless of which communication link 115 is established, the communications between the application 120 and the controller 35 will be encrypted.

Providing as mobile device 100 having an application 120 configured to directly communicate with a control panel 30 of a monitoring system 20 provides as user with a greater degree of control when managing the settings of the monitoring system 20 remotely. Also, because the functionality of the application 120 varies based on the type of communication link 115 established between the mobile device 100 and the control panel 20, the security of the monitoring system 20 is improved. In addition, because the mobile device 100 does not need to connect to a third party server to communicate with the control panel 30, remote control of the system 20 is simplified.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A remote control for a monitoring system of a building comprising:
    a mobile device having a plurality of communication channels and a media storage area; and
    an application stored in the media storage area and configured to communicate with a control panel of the monitoring system, wherein the application identifies which of the plurality of communication channels are available for communication with the control panel and dynamically selects a communication channel from the plurality of available communication channels to establish a communication link with the control panel based on a predetermined hierarchy, and the application is configured to operate in one of a plurality of modes based on the communication channel selected, wherein when both a first communication channel and a second communication channel are available, one or more actions performable by the application when the second communication channel is used to establish the communication link are limited relative to the one or more actions performable by the application when the first communication channel is used to establish the communication link.

2. The remote control device according to claim 1, wherein when a first communication channel is used to establish the communication link with the control panel, the application operates in a local mode.

3. The remote control device according to claim 1, wherein the first communication channel is configured to communicate using at least one of Bluetooth, a private wireless local area network, and a local radio frequency channel.

4. The remote control device according to claim 2, wherein when the application is in the local mode, the mobile device functions as a key fob.

5. The remote control device according to claim 2, wherein when a second communication channel is used to establish the communication link with the control panel, the application operates in a remote mode.

6. The remote control device according to claim 5, wherein the second communication channel is configured to communicate using one of a public wireless area network, another data network, and a server.

7. The remote control device according to claim 5, wherein when a third communication channel is used to establish the communication link with the control panel, the application operates in a third mode.

8. The remote control device according to claim 7, wherein the third communication channel is configured to communicate using one of a global system for mobile communications (GSM) and a short message service (SMS).

9. A monitoring system configured to integrate control of a plurality of systems comprising:
    a control panel operably coupled to a plurality of input devices, the control panel including a plurality of communication modules including a first communication module and a second communication module, wherein each of the plurality of communication modules is configured to communicate with at least one of a plurality of communication channels of a mobile device; and
    a controller configured to control operation of the plurality of communication modules and communicate with the plurality of input devices, wherein when both a first communication module and a second communication module are available for communication with the mobile device, one or more actions performable by the controller when the second communication module is used to establish the communication link are limited relative to the one or more actions performable by the controller when the first communication module is used to establish communicate with the at least one of a plurality of communication channels of the mobile device.

10. The monitoring system according to claim 9, wherein the control panel includes a first communication module, a second communication module and a third communication module.

11. The monitoring system according to claim 10, wherein the first communication module is configured to communicate using one of Bluetooth, a private wireless local area network, and a local radio frequency channel.

12. The monitoring system according to claim 10, wherein the second communication module is a configured to communicate using one of public wireless area network, another data network, and a server.

13. The monitoring system according to claim 10, wherein the third communication module is a configured to communicate using one of a global system for mobile communications (GSM) and a short message service (SMS).

14. The monitoring system according to claim 10, further comprising a display device operably coupled to the controller.

15. The monitoring system according to claim 14, wherein the display device includes a graphical user interface.

16. The monitoring system according to claim 10, further comprising a speaker operably coupled to the controller.

17. A method of establishing a communication link between a control panel of a monitoring system and a mobile device including an application configured to remotely control the monitoring system comprising:
    detecting one or more communication channels of the mobile device that are available for communication with the control panel;
    prioritizing the one or more available communication channels based on a predefined hierarchy stored within the application, wherein when the available communication channels include a first channel and a second channel, one or more actions performable by the mobile device associated with the second channel are limited relative to the one or more actions performable by the mobile device associated with the first channel; and
    selecting the available communication channel having a highest priority in the predefined hierarchy.

18. The method according to claim 17, wherein a first priority communication channel is configured to communicate using at least one of Bluetooth, a private wireless local area network, and a local radio frequency channel.

19. The method according to claim 18, wherein a second priority communication channel is configured to communicate using one of public wireless area network, another data network, and a server.

20. The method according to claim 19, wherein a third priority communication channel is configured to communicate using one of a global system for mobile communications (GSM) and a short message service (SMS).

* * * * *